(12) United States Patent
Hong

(10) Patent No.: US 10,798,263 B2
(45) Date of Patent: Oct. 6, 2020

(54) PORTABLE SCANNER AND SCANNING METHOD THEREOF

(71) Applicant: HIMO INC., Seoul (KR)

(72) Inventor: In Pyo Hong, Seoul (KR)

(73) Assignee: HIMO, INC., Seoul (KR)

( * ) Notice: Subject to any disclaimer, the term of this patent is extended or adjusted under 35 U.S.C. 154(b) by 0 days.

(21) Appl. No.: 16/342,915

(22) PCT Filed: Oct. 17, 2017

(86) PCT No.: PCT/KR2017/011481
§ 371 (c)(1),
(2) Date: Apr. 17, 2019

(87) PCT Pub. No.: WO2018/074823
PCT Pub. Date: Apr. 26, 2018

(65) Prior Publication Data
US 2020/0045199 A1  Feb. 6, 2020

(30) Foreign Application Priority Data

Oct. 20, 2016 (KR) .................. 10-2016-0136283

(51) Int. Cl.
*G06K 7/10* (2006.01)
*H04N 1/024* (2006.01)
*G01B 11/25* (2006.01)
*H04N 5/232* (2006.01)
*H04N 1/00* (2006.01)

(52) U.S. Cl.
CPC ......... *H04N 1/02409* (2013.01); *G01B 11/25* (2013.01); *H04N 1/00559* (2013.01); *H04N 1/00827* (2013.01); *H04N 1/02418* (2013.01); *H04N 5/23222* (2013.01)

(58) Field of Classification Search
USPC ........................................ 235/454
See application file for complete search history.

(56) References Cited

U.S. PATENT DOCUMENTS 7,877,006 B2  1/2011  Moriya et al.
8,104,899 B2  1/2012  Ha et al.
(Continued)

FOREIGN PATENT DOCUMENTS

EP  1835732 A2  9/2007
EP  2926722 A1  10/2015
(Continued)

OTHER PUBLICATIONS

Extended European Search Report for EP Application No. 17861381.6 dated Aug. 23, 2019, 13 pages long.
(Continued)

*Primary Examiner* — Jamara A Franklin
(74) *Attorney, Agent, or Firm* — Wegman Hessler

(57) ABSTRACT

The present disclosure relates to a portable scanner capable of increasing the precision of focus and a scanning method using the same. According to an embodiment of the present disclosure, the portable scanner, which generates a three dimensional (3D) image from a subject, includes a focus state output device to determine a present focus state with respect to a set focal length from a subject and to output the present focus state such that a user recognizes the present focus state.

14 Claims, 10 Drawing Sheets

(56) References Cited

U.S. PATENT DOCUMENTS

| | | | |
|---|---|---|---|
| 8,670,022 B2 | 3/2014 | Kim et al. | |
| 8,917,346 B2 | 12/2014 | Geisler et al. | |
| 10,149,615 B2 | 12/2018 | Sakai et al. | |
| 10,226,175 B2 | 3/2019 | Sakai et al. | |
| 2007/0212051 A1 | 9/2007 | Moriya et al. | |
| 2008/0073434 A1* | 3/2008 | Epshteyn | G06K 7/10 235/454 |
| 2012/0078113 A1 | 3/2012 | Whitestone et al. | |
| 2014/0049611 A1 | 2/2014 | Woo et al. | |
| 2015/0021228 A1 | 1/2015 | Su et al. | |
| 2015/0313467 A1 | 11/2015 | Sakai et al. | |
| 2017/0042422 A1 | 2/2017 | Sakai et al. | |

FOREIGN PATENT DOCUMENTS

| | | |
|---|---|---|
| JP | H05127244 A | 5/1993 |
| JP | 2004132759 A | 4/2004 |
| JP | 2005024843 A | 1/2005 |
| JP | 2008146024 A | 6/2008 |
| JP | 2013182062 A | 9/2013 |
| JP | 2015216545 A | 12/2015 |
| KR | 20020081981 A | 10/2002 |
| KR | 20090022053 A | 3/2009 |
| KR | 1020120064477 A | 6/2012 |
| KR | 20130071059 A | 6/2013 |
| KR | 1020140028539 A | 3/2014 |
| KR | 1020140057190 A | 5/2014 |
| KR | 1020140077751 A | 6/2014 |
| KR | 101661969 B | 10/2016 |

OTHER PUBLICATIONS

International Search Report and Written Opinion dated Apr. 26, 2018, in International Application No. PCT/KR2017/011481, 16 pages.

Japanese Office Action for corresponding Japanese Application No. 2019-521091 dated Jul. 15, 2020, 5 pgs.long.

* cited by examiner

PORTABLE SCANNER AND SCANNING METHOD THEREOF

TECHNICAL FIELD

The present disclosure relates to a portable scanner capable of increasing the precision of focus and a scanning method using the same.

BACKGROUND ART

A 3D scanner, which is a device to generate a three-dimensional (3D) image by irradiating a subject with pattern light and photographing a two-dimensional (2D) image of the subject irradiated with the pattern light, has been applied to various fields.

The 3D scanner has been produced in a fixed type because the distance from the subject has been constantly maintained.

Accordingly, the conventional 3D scanner has a large volume and it is inconvenient for a user to carry with the 3D.

Meanwhile, when a portable 3D scanner is manufactured, a focus is not uniformly maintained from the subject in scanning. Accordingly, the degree of precision may be lowered.

DISCLOSURE

Technical Problem

The present disclosure is made by keeping in mind the above problems, and the present disclosure is to provide a portable scanner and a scanning method using the same, capable of uniformly setting the subject at a set focal length.

Technical Solution

In order to solve the technical problem, according to an embodiment of the present disclosure, there is provided a portable scanner to generate a three dimensional (3D) image from a subject. The portable scanner includes a focus state output device to determine a present focus state with respect to a set focal length from a subject and to output the present focus state such that a user recognizes the present focus state.

The focus state output device may include a first light emitting device to obliquely irradiate a focusing beam to a surface of the subject at a predetermined angle, a sensor to sense a position of the focusing beam irradiated to the subject, and a focus state determining device to determine a focus state with respect to the set focal length based on the position of the focusing beam sensed in a region of interest of the subject.

The focus state determining device may determine the focus state as a first focus state when a distance from the subject is shorter than the set focal length, may determine the focus state as a second focus state when the distance from the subject is equal to the set focal length, and may determine the focus state as a third focus state when the distance from the subject is longer than the set focal length.

In addition, the focus state determining device may determine the focus state as a first focus state, when a distance from the subject is different from the set focal length, and determine the focus state as a second focus state when the distance from the subject is equal to the set focal length.

The focus state output device may further include a second light emitting device to output the determined focus state in a form of a visible light, to the subject such that the user recognizes the determined focus state.

The second light emitting device may output the focus state in a form of at least one of a preset character, a preset sign, or mutually different colors.

In this case, an irradiation angle of the first light emitting device and a sensing angle of the sensor may be adjusted based on the set focal length.

According to an embodiment of the present disclosure, the portable scanner may further include a third light emitting device to irradiate the subject with a set pattern light; a photographing device to photograph the subject irradiated with the set pattern light; and a controller to generate 3D image data of the subject using multiple pieces of 2D image data obtained by photographing the subject in mutual different directions.

According to an embodiment of the present disclosure, the portable scanner may further include a display to display image data obtained by the photographing device.

The controller may perform a control operation to display, on the display, the focus state together with the image data obtained by the photographing device, and to display, on the display, the focus state in a form of at least one of a preset character, a preset sign, or mutually different colors.

According to an embodiment of the present disclosure, the portable scanner may further include a support stand detachably coupled to a body of the portable scanner to fix the portable scanner at a specific height. The support stand may include a rotating device to allow the body of the coupled portable scanner to be rotatable up, down, left, and right.

For example, the subject is a head mesh which has a pattern set to produce a toupee to be put on a head of the user.

Meanwhile, according to another embodiment of the present disclosure, a scanning method may include determining a present focus state with respect to a set focal length from a subject and outputting the present focus state to a display such that a user recognizes the present focus state; sequentially irradiating the subject with set pattern lights at the set focal length while photographing the subject irradiated with the pattern lights; and generating 3D image data of the subject by using multiple pieces of 2D image data obtained by repeating the photographing for the subject in mutual different directions.

The outputting of the present focus state may include obliquely irradiating a focusing beam to a surface of the subject, at a predetermined angle; sensing a position of the focusing beam irradiated to the subject; and determining a focus state with respect to the set focal length based on a position of the focusing beam sensed in a region of interest of the subject.

In addition, the outputting of the present focus state may further include outputting the determined focus state, in a form of a visible light, to the subject such that the user recognizes the determined focus state.

Advantageous Effects

According to the present disclosure, higher precision may be maintained because the subject is uniformly scanned at the set focal length by marking a focus state.

In addition, the scanner body and the support stand are detachably manufactured, and thus the scanner body and the support stand may be easily carried.

The detailed effects of the present disclosure will be described in detail below through embodiments.

DESCRIPTION OF DRAWINGS

FIG. 4 is a view illustrating the position of a beam sensed by a sensor of FIG. 2.

MODE FOR INVENTION

Figure 1:
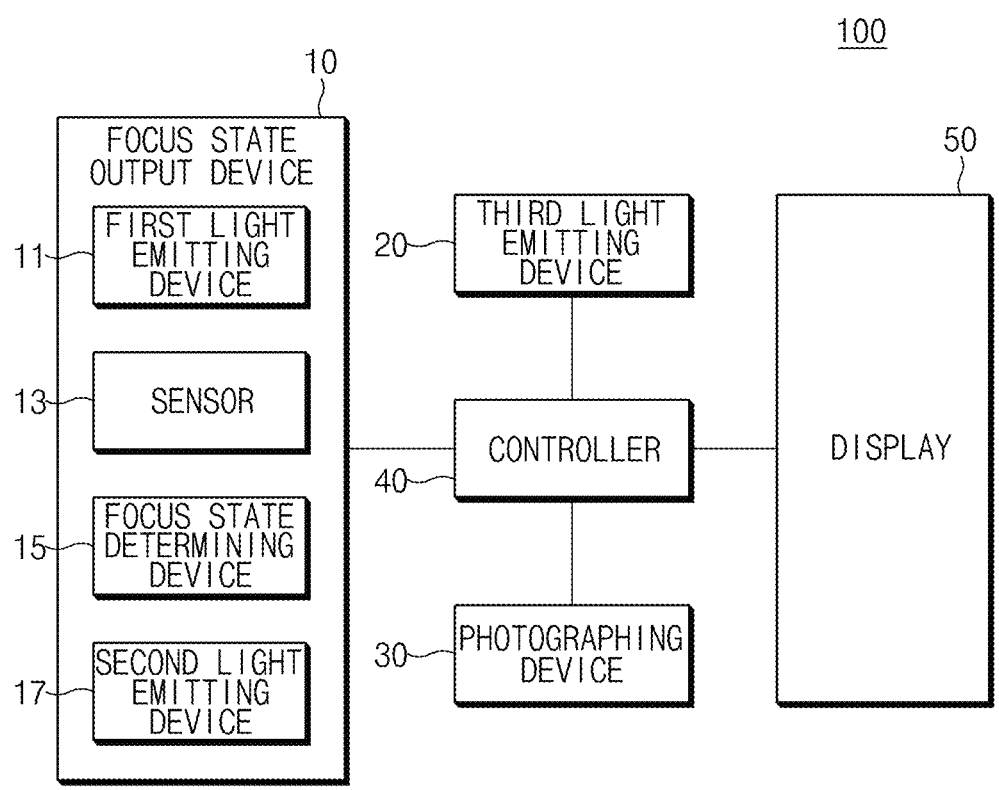
FIG. 1 is a block diagram illustrating a portable scanner, according to an embodiment of the present disclosure.

While the invention is susceptible to various modifications and alternative forms, specific embodiments thereof are shown by way of example in the drawings and will be described in detail in the detailed description. It should be understood, however, that there is no intent to limit the invention to the particular embodiment forms, but on the contrary, the invention is to cover all transforms, equivalents, and alternatives falling within the spirit and scope of the invention. In addition, in the following description of the present disclosure, a detailed description of well-known art or functions will be ruled out in order not to unnecessarily obscure the gist of the present disclosure.

The terminology used herein to describe embodiments of the invention is not intended to limit the scope of the invention. As used herein, the singular forms are intended to include the plural forms as well, unless the context clearly indicates otherwise. In the subject application, it will be further understood that the terms "comprises," "comprising," "includes," or "including," or "having" specify the presence of stated features, numbers, steps, operations, components, parts, or the combination thereof, but do not preclude the presence or addition of one or more other features, numbers, steps, operations, components, components, and/or the combination thereof.

Hereinafter, embodiments according to the present disclosure will be described with reference to accompanying drawings. In the following description made with reference to accompanying drawings, same or similar components will be assigned with same reference numerals, and the redundant repeat thereof will be omitted.

FIG. 1 is a block diagram illustrating a portable scanner, according to an embodiment of the present disclosure.

As illustrated in FIG. 1, according to the present disclosure, the portable scanner, which is a device to generate a 3D image from a subject, may include a focus state output device 10, a third light emitting device 20, a photographing device 30, a controller 40, and a display 50.

First, the focus state output device 10 is a component to determine a present focus state with respect to a set focal length (or a focal length range) from the subject and to allow a user to recognize the present focus state.

The focus state output device 10 may include a first light emitting device 11, a sensor 13, and a focus state determining device 15. The first light emitting device 11 obliquely irradiates a surface of the subject with a focusing beam at a predetermined angle. The sensor 13 senses the position of the focusing beam which is irradiated to the subject. The focus state determining device 15 determines a focus state with respect to the set focal length based on the position of the focus beam, which is sensed in an interest of region of the subject.

For example, the focus state determining device 15 may determine the focus state as a first focus state (that is, a short state) when the distance from the subject is shorter than the set focal length. When the distance from the subject is equal to the set focal length, the focus state determining device 15 may determine the focus state as a second focus state (that is, a normal focus state). When the distance from the subject is longer than the set focal length, the focus state determining device 15 may determine the focus state as a third focus state.

Figure 2:
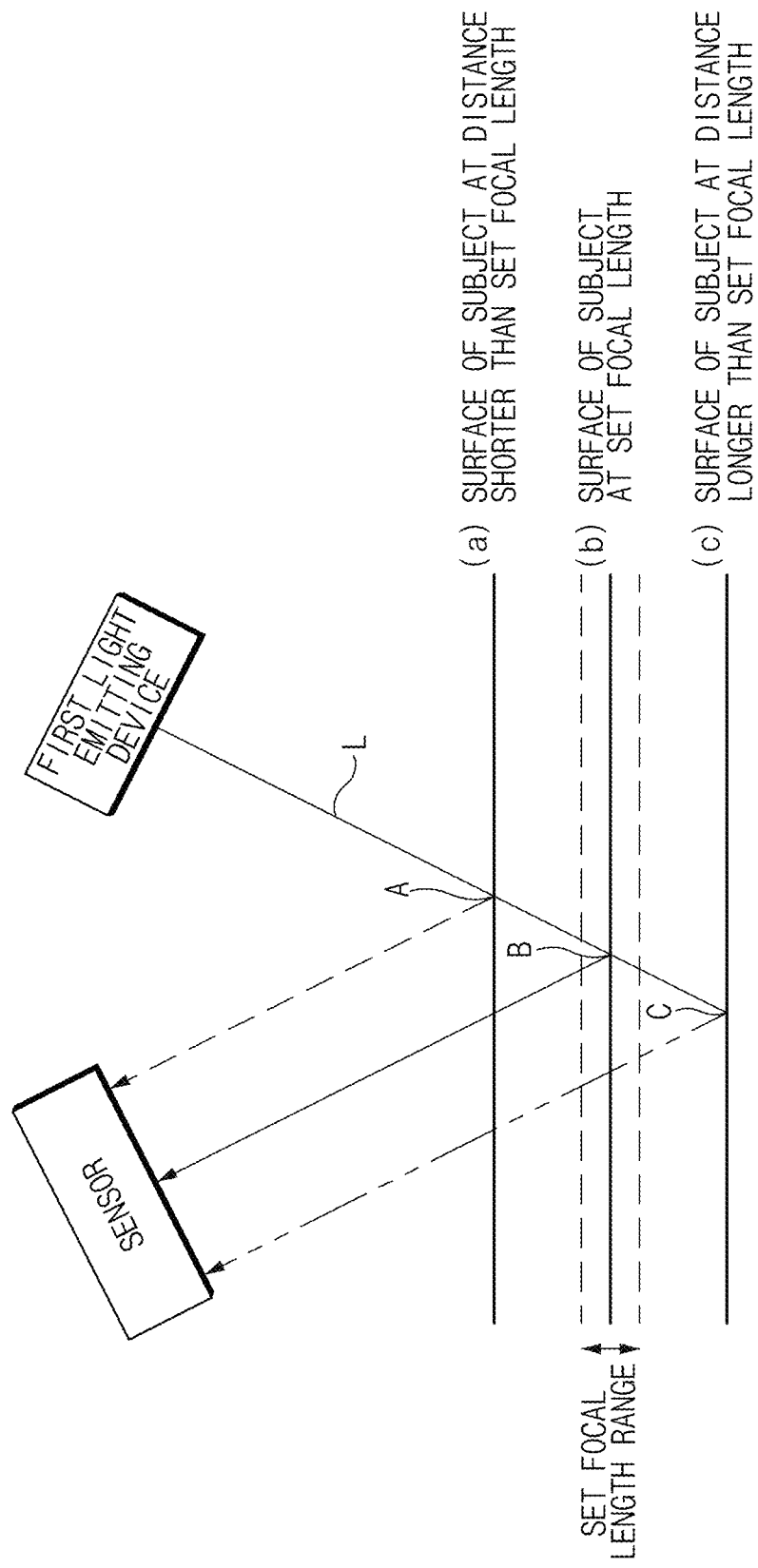
FIG. 2 is a schematic view illustrating the principle of determining the focus state.
Figure 3:
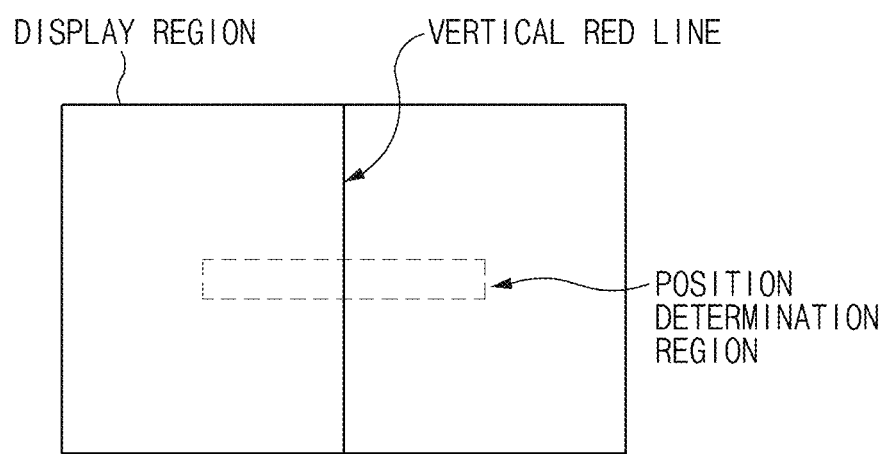
FIG. 3 is a view illustrating a beam irradiated by a first light emitting device of FIG. 2.
Figure 4A:
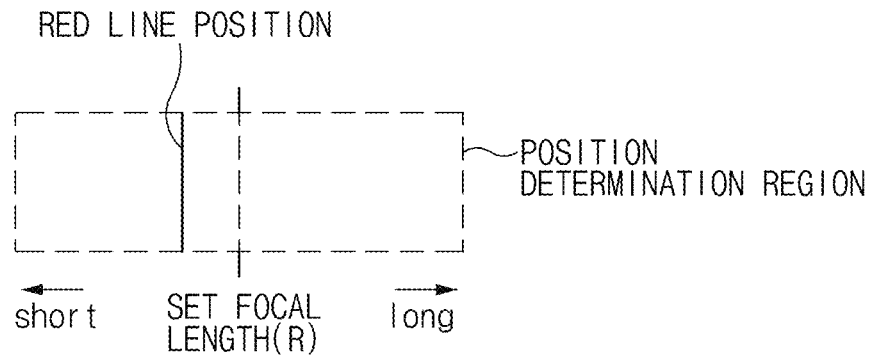
FIG. 4A illustrates the position of the beam when the distance from the subject is shorter than a set focal length.
Figure 4B:
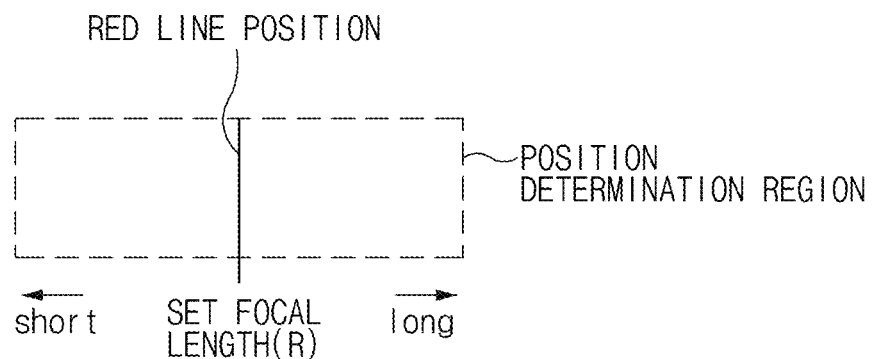
FIG. 4B illustrates the position of the beam when the distance from the subject is equal to the set focal length.
Figure 4C:
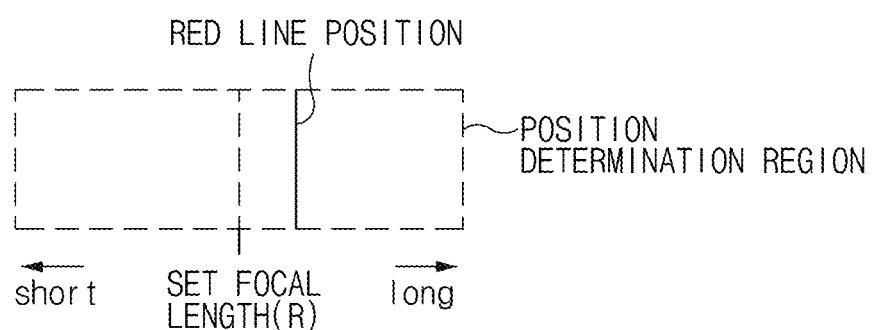
FIG. 4C is a view illustrating the position of the beam when the distance from the subject is longer than the set focal length.

The following description will be made regarding the principle that the focus state output device 10 determines the focus state according to an embodiment of the present disclosure. FIG. 2 is a schematic view illustrating the principle of determining the focus state. FIG. 3 is a view illustrating a beam irradiated by the first light emitting device of FIG. 2. FIG. 4 is a view illustrating the position of a beam sensed by the sensor of FIG. 2. FIG. 4A illustrates the position of the beam when the distance from the subject is shorter than the set focal length, FIG. 4B illustrates the position of the beam when the distance from the subject is equal to the focal length, and FIG. 4C is a view illustrating the position of the beam when the distance from the subject is longer than the set focal length.

First, as illustrated in FIG. 2, the first light emitting device 11 of the focus state output device 10 obliquely irradiates the surface of the subject with a focus beam L at a predetermined angle. Accordingly, the position of the beam irradiated to the subject may be varied depending on the distance between the first light emitting device 10 and the subject. In this case, the posture (or the angle) between the first light emitting device 11 and the sensor 13 may be adjusted in advance depending on the focal length set in the portable scanner.

For example, as illustrated in reference sign (a) of FIG. 2, when the surface of the subject is positioned at a distance shorter than the set focal length, the focusing beam is irradiated to part A, which is positioned at the right side of the position of the set focal length.

In addition, as illustrated in reference sign (b) of FIG. 2, when the surface of the subject is positioned at the set focal length, the focusing beam is irradiated to set part B which is set.

In addition, as illustrated in reference sign (c) of FIG. 2, when the surface of the subject is positioned at a distance far away from the set focal length, the focusing beam is irradiated to part C which is positioned at the left side of the position of the focal length.

In this case, the focusing beam may be irradiated, in the form of a vertical red line, to a region (that is, the display region), which is to be photographed, as illustrated in FIG. 3.

The sensor 13 senses the position of the focusing beam, which is irradiated to the subject. In this case, the horizontal position of the sensed red line may be varied depending on the focal length as illustrated in FIG. 4.

For example, as illustrated in reference sign (a) of FIG. 4, when the distance from the subject is shorter than the set focal length, the position of the sensed red line (that is, the focusing beam) is positioned at the left side (short direction) of the set focal length portion in the position determination region. In addition, as the distance from the subject becomes shorter, the sensed red line is moved to the left.

For example, as illustrated in reference sign (b) of FIG. 4, when the distance from the subject is equal to the set focal length, the position of the sensed red line (that is, the focusing beam) is positioned at the focal length portion set in the position determination region.

For example, as illustrated in reference sign (c) of FIG. 4, when the distance from the subject is longer than the set focal length, the position of the sensed red line (that is, the focusing beam) is positioned at the right side (Long direction) of the set focal length portion in the position determination region. In addition, as the distance from the subject becomes longer, the sensed red line is moved to the right.

Although the present embodiment has been described in that the red line moves to the left, when the distance from the subject is shorter than the set focal length, and moves to the right when the distance from the subject is longer than the set focal length, the present disclosure is not limited thereto. Accordingly, the left and right may be changed depending on the positions of the first light emitting device 11 and the sensor 13.

As described above, the focus state determining device 15 may determine the focus state depending on the distance from the subject. For example, the first light emitting device 11 may be a component included in a projector of a scanner, and the sensor 13 may be a component included in a camera of the scanner.

Alternatively, as another example, the focus state determining device 15 may determine only whether the focus state is a set focus state depending on the distance from the subject. For example, when the distance from the subject is different from the set focal length, the focus state determining device 15 may determine the focus state as the first focus state. When the distance from the subject is equal to the set focal length, the focus state determining device 15 may determine the focus state as the second focus state.

In addition, the focus state output device 10 may further include the second light emitting device 17. The second light emitting device 17 outputs a visual light to the subject such that the focus state determined by the focus state determining device 15 is recognized by the user.

For example, the second light emitting device 17 may output the focus state in the form of at least one of a preset character, sign, or mutually different colors. For example, the second light emitting device 17 may output the word of "SHORT" when the distance from the subject is shorter than the set focal length. When the distance from subject is equal to the set focal length, the second light emitting device 17 may output the word of "FOCUS". When the distance from the subject is longer than the set focal length, the second light emitting device 17 may output the word of "LONG".

Alternatively, the second light emitting device 17 may output the word of "SHORT" in red (R) when the distance from the subject is shorter than the set focal length. When the distance from subject is equal to the set focal length, the second light emitting device 17 may output the word of "FOCUS" in green (G). When the distance from the subject is longer than the set focal length, the second light emitting device 17 may output the word of "LONG" in blue (B).

For another example, when the distance from the subject is different from the set focal length, the second light emitting device 17 may output a sign of "x". When the distance from the subject is equal to the set focal length, the second light emitting device 17 may output a sign of "o".

Accordingly, the focus state is displayed by the focus state output device 10, so the subject is uniformly scanned at the set focal length. Accordingly, the high precision may be maintained. In particular, a scanner, which produces one piece of 3D image data by composing multiple pieces of 2D image data, may obtain the 2D image data at a uniform focal length, so the scanner is more effective.

According to another embodiment, the focus state output device 10 may determine the focus state through another component and another focus state determining principle. For example, the focal length may be identified using a time of flight (TOF) scheme and the focus state may be determined. For example, the focus state output device 10 may include a signal generator to generate a set signal, such as a near infrared light, a ultrasonic light, or a laser light, and to output the set signal to the subject, a sensor to sense a signal reflected from the subject, and a focus state determining device to determine the focus state with respect to the set focal length using time taken to receive the sensed signal.

Subsequently, a remaining component of the portable scanner will be described with reference to FIG. 1.

The third light emitting device 20 is a component to sequentially irradiate N set pattern lights (e.g., the structured light pattern) to the subject to generate the 3D image of the subject. The third light emitting device 20 is a component which becomes the projector of a typical portable scanner.

The photographing device 30 is a component to photograph a subject irradiated with the pattern light. The photographing device 30 is a component which becomes a camera of the portable scanner.

The controller 40, which is a component to control the focus state output device 10, the third light emitting device 20, the photographing device 30, and the display 50, is a processor to generate 3D image data of the subject by using multiple pieces of 2D image data obtained by photographing the subject in mutually different directions. In this case, generating the 3D image data of the subject by using the third light emitting device 20, the photographing device 30, and the controller 40 belongs to a well-known technology, so the details thereof will be omitted.

In addition, the display 50 is a component to display 2D image data obtained by the photographing device. For example, the display 50 may be implemented with a touch panel.

In this case, the controller 40 may perform a control operation such that the focus state is displayed on the display 50 together with the 2D image data obtained by the photographing device. In addition, although not illustrated, the portable scanner according to the present disclosure may further include an input device to input a handling signal of a user.

Figure 8:
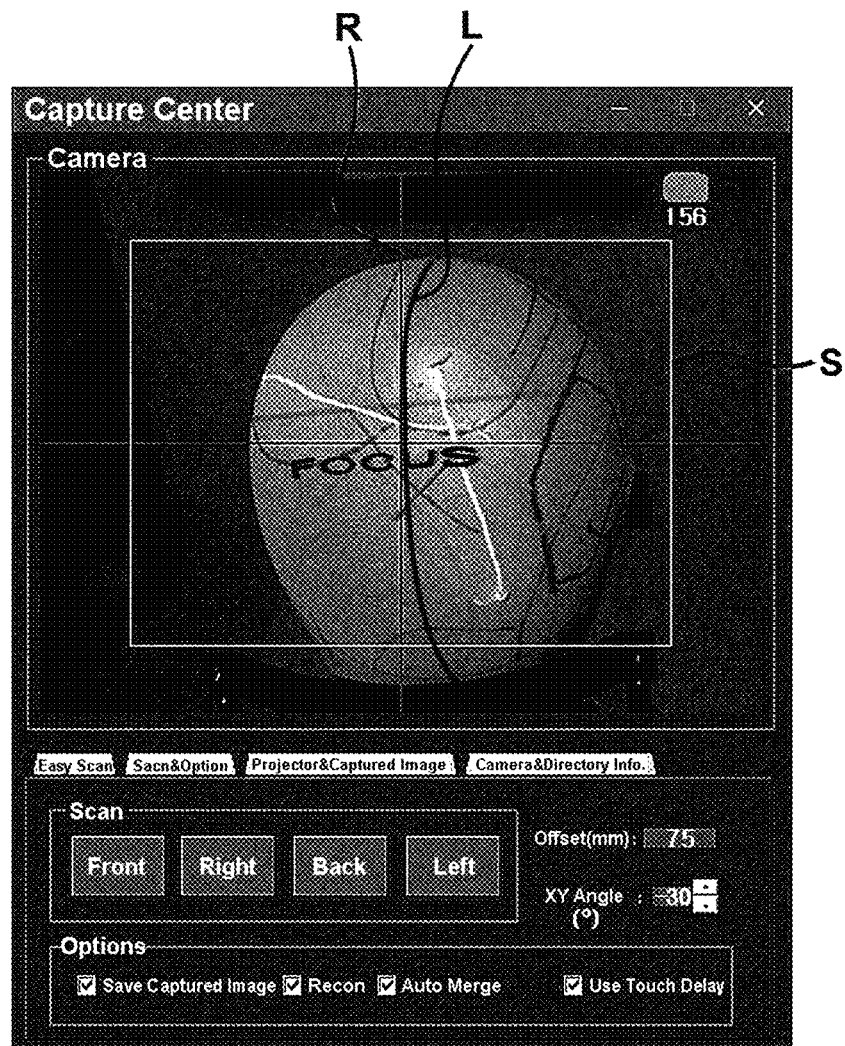
FIG. 8 is a view illustrating that the portable scanner photographs the subject at the set focal length.
Figure 9:
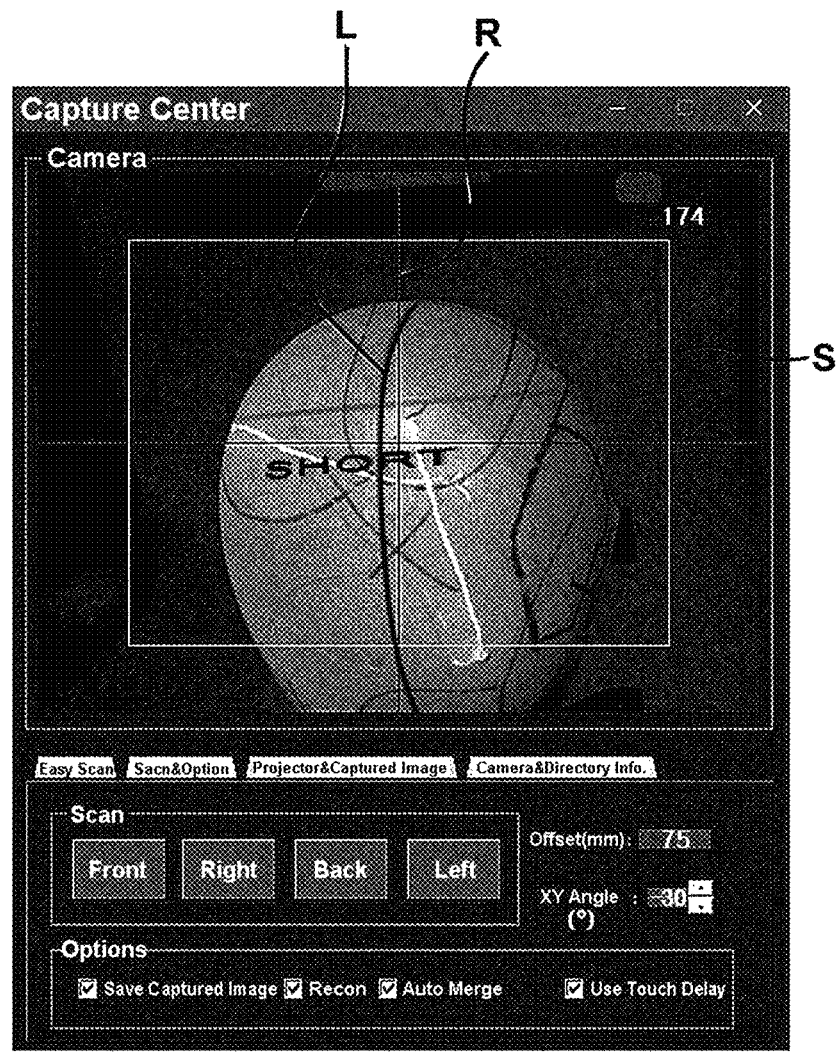
FIG. 9 is an example that the portable scanner photographs the subject at a distance shorter than the set focal length.
Figure 10:
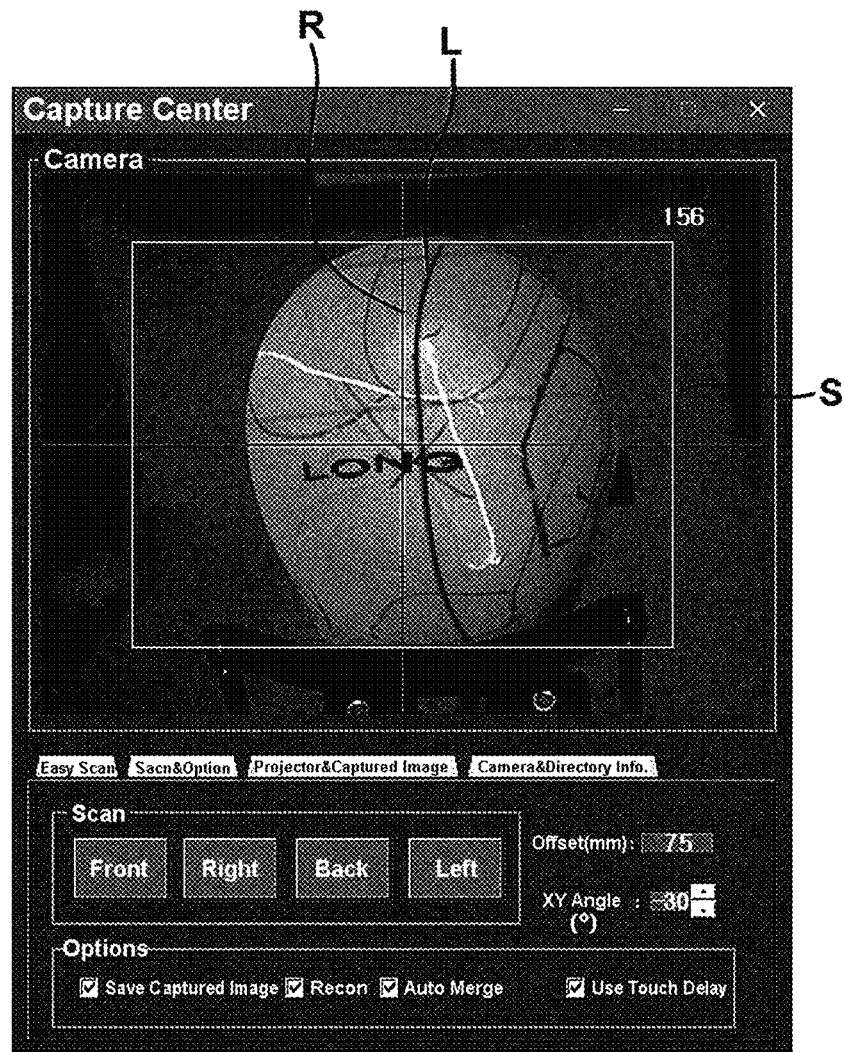
FIG. 10 is an example that the portable scanner photographs a subject at a distance longer than the set focal length.

Subsequently, hereinafter, an example that the focus state is displayed together with the image data of the subject through the display will be described with reference to FIGS. 8 to 10. FIG. 8 is an example that the portable scanner photographs a subject at the set focal length. FIG. 9 is an example that the portable scanner photographs the subject at a distance shorter than the set focal length. FIG. 10 is an example that the portable scanner photographs the subject at a distance longer than the set focal length.

First, as illustrated in FIG. 8, when the portable scanner photographs the subject at the set focal length, the display displays the subject on a display region S. In this case, the focusing beam L irradiated to the subject may be, in position, the same as or substantially similar to a set focal length reference line R in a set region of interest (that is, the position determination region; not illustrated) of the display region S. In this case, the display region S is a region serving as a reference to guide a user such that the user positions the subject at the center of the camera. Meanwhile, as illustrated through a numerical value of "156" and a colored block (green □) displayed on the upper right portion of FIG. 8, the display may display the present focus state, which is determined by the focus state determining device, in the form of the numeric value or may display the present focus state in the form of the colored block (for example, green indicating the normal focus state). In addition, as illustrated through the sign of "FOCUS" displayed on the subject, the present focus state may be output in the form of a visible light through the second light emitting device 17.

As illustrated in FIG. 9, when the portable scanner photographs the subject at the distance shorter than the set focal length, the focusing beam L irradiated to the subject is positioned at the left side of the set focal length reference line R in the set region of interest (that is, the position determination region; not illustrated) of the display region S. Similarly, as illustrated through a numerical value of "174" and a colored block (red □) displayed on the upper right part of FIG. 9, the display may display the present focus state, which is determined by the focus state determining device, in the form of the numeric value or may display the present focus state in the form of the colored block (for example, red indicating the shorter focal length state). In addition, as illustrated through the sign of "SHORT" displayed on the subject, the present focus state may be output in the form of a visible light through the second light emitting device 17.

As illustrated in FIG. 10, when the portable scanner photographs the subject at the distance longer than the set focal length, the focusing beam L irradiated to the subject is positioned at the right side of the set focal length reference line R in the set region of interest (that is, the position determination region; not illustrated) of the display region S. Similarly, as illustrated through a numerical value of "156" and a colored block (blue □) displayed on the upper right part of FIG. 10, the display may display the present focus state, which is determined by the focus state determining device, in the form of the numeric value or may display the present focus state in the form of the colored block (for example, blue indicating the shorter focal length state). In addition, as illustrated through the sign of "LONG" displayed on the subject, the present focus state may be output in the form of a visible light through the second light emitting device 17.

The focus state displayed on the display may be displayed in the form of a preset character, sign, or mutually different colors.

Accordingly, the user may be guided such that the user may recognize the present focus state through the display and thus may photograph the subject at an exact focal length. In addition, the user may identify the beam indicating the focus state irradiated on the subject and may first substantially determine the focus position.

As described above, in the portable scanner of the present disclosure, the first light emitting device 11, the second light emitting device 17, and the third light emitting device 20 may be implemented in the form of one projector. In addition, the sensor 13 and the photographing device 30 may be implemented in the form of one camera. In addition, the focus state determining device 15, the controller 40, the display 50, and the input device may be implemented in the form of one data processing device. In addition, the display and the input device may be implemented in the form of a touch panel.

Figure 7:
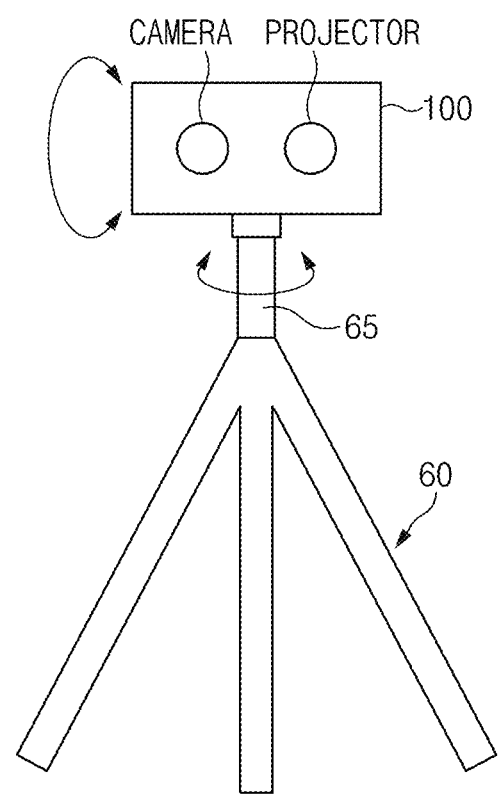
FIG. 7 is a view illustrating a scanner body and a stand support.

In addition, according to the present disclosure, the portable scanner may further include a support stand 60 as illustrated in FIG. 7. The support stand 60 is detachably coupled to a body 100 of the portable scanner and fixes the portable scanner at a specific height. The support stand 60 may include a rotating device 65 to rotate the body 100 of the coupled portable scanner up, down, left, and right. Accordingly, the body of the scanner and the support stand are produced separately from each other, so the scanner and the support stand are easily carried.

The subject may be a head mesh which has a pattern set to produce a toupee to be put on the head of the user. Accordingly, according to the present disclosure, the portable scanner may be used as a scanner for producing the toupee.

Figure 5:
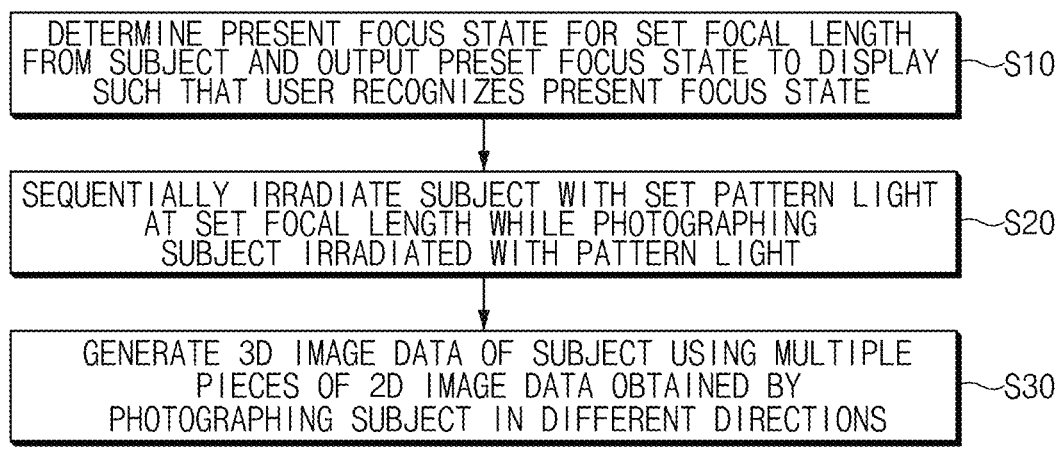
FIG. 5 is a flowchart illustrating the 3D scanning method according to an embodiment of the present disclosure.

Hereinafter, a 3D scanning manner according to the present disclosure will be described with reference to FIGS. 5 and 6. FIG. 5 is a flowchart illustrating the 3D scanning method according to an embodiment of the present disclosure. In addition, FIG. 6 is a flowchart illustrating a procedure of determining the focus state by the focus state output device.

As illustrated in FIG. 5, the focus state output device 10 determines a present focus state with respect to a set focal length from the subject and outputs the present focus state on the display 50 such that user recognizes the present focus state (S10). Thereafter, while the third light emitting device 20 is irradiating the subject with N set pattern lights at the set focal length, the subject irradiated with the pattern lights is photographed by the photographing device 30 (S20). Operations S10 and S20 are repeatedly performed with respect to the subject in mutually different directions to generate the 3D image data of the subject by using multiple pieces of 2D image data which is photographed (S30).

Figure 6:
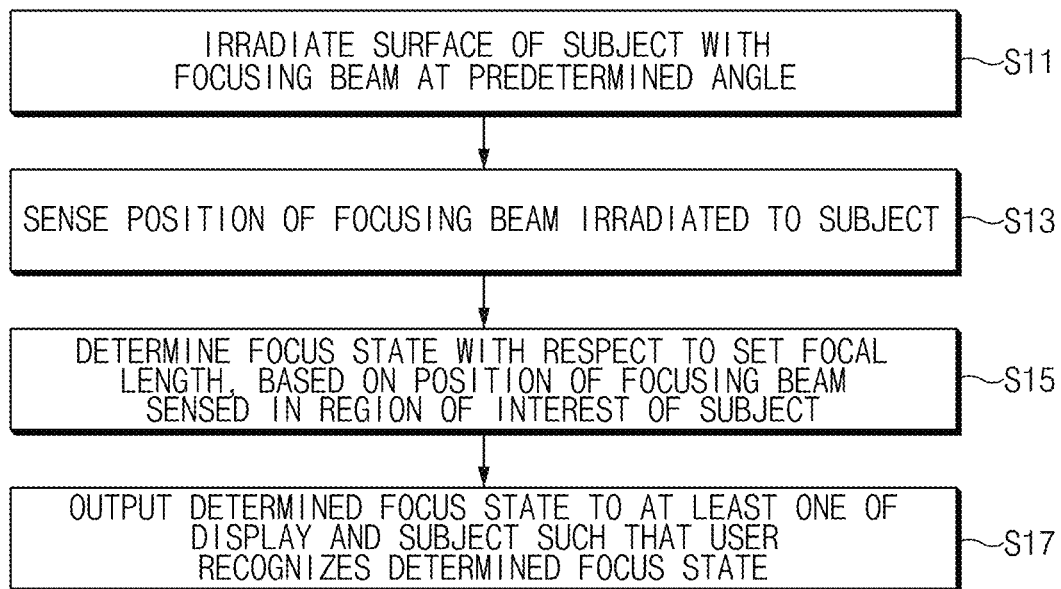
FIG. 6 is a flowchart illustrating a procedure of determining a focus state by the focus state output device.

Operation S10 of outputting the present focus state may undergo the determination procedure in detail as in FIG. 6. The first light emitting device 11 of the focus state output device 10 obliquely irradiates the surface of the subject with a focusing beam at a predetermined angle (S11). Thereafter, the sensor 13 of the focus state output device 10 senses the position of the focusing beam irradiated to the subject (S13). Subsequently, the focus state determining device 15 of the focus state output device 10 determines the focus state with respect to the set focal length, based on the position of the focusing beam sensed in the region of interest of the subject (S15). In addition, the determined focus state may be output to the subject in the form of a visible light by the second light emitting device 17 such that the user recognizes the focus state.

According to the present disclosure, the focus state is displayed so the subject is uniformly scanned at the set focal length. Accordingly, the high precision may be maintained.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

The invention claimed is:

1. A portable scanner to generate a three dimensional (3D) image from a subject, the portable scanner comprising:
a focus state output device to determine a present focus state with respect to a set focal length from a subject and to output the present focus state such that a user recognizes the present focus state,
wherein the focus state output device includes:
a first light emitting device to obliquely irradiate a focusing beam to a surface of the subject at a predetermined angle;
a sensor to sense a position of the focusing beam irradiated to the subject;
a focus state determining device to determine a focus state with respect to the set focal length based on the position of the focusing beam sensed in a region of interest of the subject; and
a second light emitting device to output the determined focus state in a form of a visible light, to the subject such that the user recognizes the determined focus state, the second light emitting device outputting the focus state in a form of at least one of a preset character, a preset sign, or mutually different colors.

2. The portable scanner of claim 1, wherein the focus state determining device:
determines the focus state as a first focus state when a distance from the subject is shorter than the set focal length;
determines the focus state as a second focus state when the distance from the subject is equal to the set focal length; and
determines the focus state as a third focus state when the distance from the subject is longer than the set focal length.

3. The portable scanner of claim 1, wherein the focus state determining device:
determines the focus state as a first focus state, when a distance from the subject is different from the set focal length; and
determines the focus state as a second focus state when the distance from the subject is equal to the set focal length.

4. The portable scanner of claim 1, further comprising:
a third light emitting device to irradiate the subject with a set pattern light;
a photographing device to photograph the subject irradiated with the set pattern light; and
a controller to generate 3D image data of the subject by using multiple pieces of 2D image data obtained by photographing the subject in mutual different directions.

5. The portable scanner of claim 4, further comprising:
a display to display image data obtained through photographing of the photographing device.

6. The portable scanner of claim 5, wherein the controller performs a control operation to display the focus state on the display together with the image data obtained through the photographing of the photographing device.

7. The portable scanner of claim 1, further comprising:
a support stand detachably coupled to a body of the portable scanner to fix the portable scanner at a specific height.

8. The portable scanner of claim 7, wherein the support stand includes:
a rotating device to allow the body of the coupled portable scanner to be rotatable up, down, left, and right.

9. The portable scanner of claim 1, wherein the subject is a head mesh which has a pattern set to produce a toupee to be put on a head of the user.

10. The portable scanner of claim 1, wherein an irradiation angle of the first light emitting device and a sensing angle of the sensor are adjusted based on the set focal length.

11. A portable scanner comprising:
a first light emitting device to obliquely irradiate a focusing beam to a surface of a subject, at a predetermined angle;
a sensor to sense a position of the focusing beam irradiated to the subject;
a focus state determining device to determine a focus state with respect to a set focal length based on a position of the focusing beam sensed in a region of interest of the subject;
a second light emitting device to irradiate the subject with a set pattern light;
a photographing device to photograph the subject irradiated with the set pattern light;
a display to display image data obtained by the photographing device; and
a controller to generate 3D image data of the subject using multiple pieces of 2D image data obtained by photographing the subject in mutual different directions, and to perform a control operation to display, on the display, the focus state together with the image data obtained by the photographing device.

12. The portable scanner of claim 11, wherein the controller:
performs the control operation to display, on the display, the focus state in a form of at least one of a preset character, a preset sign, or mutually different colors.

13. A scanning method comprising:
determining a present focus state with respect to a set focal length from a subject and outputting the present focus state to at least one of a display and the subject such that a user recognizes the present focus state;
sequentially irradiating the subject with set pattern lights at the set focal length while photographing the subject irradiated with the pattern lights; and
generating 3D image data of the subject by using multiple pieces of 2D image data obtained by repeating the photographing for the subject in mutual different directions,
wherein the determining of the present focus state includes:
obliquely irradiating a focusing beam to a surface of the subject, at a predetermined angle;
sensing a position of the focusing beam irradiated to the subject; and
determining a focus state with respect to the set focal length based on a position of the focusing beam sensed in a region of interest of the subject.

14. The scanning method of claim 13, wherein the outputting of the present focus state further includes:

outputting the determined focus state, in a form of a visible light, to the subject such that the user recognizes the determined focus state.

* * * * *